United States Patent
Jiang et al.

(10) Patent No.: US 12,550,066 B2
(45) Date of Patent: Feb. 10, 2026

(54) POWER ADJUSTMENT METHOD, APPARATUS, AND SYSTEM

(71) Applicant: HUAWEI TECHNOLOGIES CO., LTD., Guangdong (CN)

(72) Inventors: Zhenjun Jiang, Hangzhou (CN); Yunfei Qiao, Hangzhou (CN); Bin Wang, Hangzhou (CN); Dali Qin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 522 days.

(21) Appl. No.: 17/968,018

(22) Filed: Oct. 18, 2022

(65) Prior Publication Data

US 2023/0047970 A1  Feb. 16, 2023

Related U.S. Application Data

(63) Continuation of application No. PCT/CN2021/082494, filed on Mar. 23, 2021.

(30) Foreign Application Priority Data

Apr. 22, 2020 (CN) .......................... 202010323558.9

(51) Int. Cl.
H04W 52/02 (2009.01)
(52) U.S. Cl.
CPC ... H04W 52/0238 (2013.01); H04W 52/0206 (2013.01); H04W 52/0251 (2013.01)

(58) Field of Classification Search
CPC . H04W 52/00; H04W 52/02; H04W 52/0203; H04W 52/0206; H04W 52/0209;
(Continued)

(56) References Cited

U.S. PATENT DOCUMENTS 9,603,098 B2 * 3/2017 Ryoo .................... H04W 76/27
2008/0279163 A1   11/2008 Desai
(Continued)

FOREIGN PATENT DOCUMENTS

CN  1294477 A    5/2001
CN  1728581 A  * 2/2006
(Continued)

OTHER PUBLICATIONS

R1-1716040, Samsung, On UL Power Control, 3GPP TSG RAN WG1 Meeting NR#3, Nagoya, Japan Sep. 18-21, 2017, 6 pages.
(Continued)

*Primary Examiner* — Matthew W Genack

(57) ABSTRACT

Embodiments of this disclosure provide a power adjustment method, apparatus, and system. A first access network device may obtain a power back-off value at a first moment, and compare the power back-off value at the first moment with a power back-off value at a second moment. The second moment is earlier than the first moment. When a difference between the power back-off value at the second moment and the power back-off value at the first moment is greater than or equal to a first threshold, the first access network device adjusts an output power based on the power back-off value at the first moment.

16 Claims, 5 Drawing Sheets

(58) Field of Classification Search
CPC ......... H04W 52/0225; H04W 52/0238; H04W 52/0251; H04W 52/04; H04W 52/06; H04W 52/24; H04W 52/242; H04W 84/06
See application file for complete search history.

(56) References Cited

U.S. PATENT DOCUMENTS

| | | | |
|---|---|---|---|
| 2012/0135778 A1* | 5/2012 | Tian | H04L 1/0003 455/524 |
| 2014/0064211 A1 | 3/2014 | Cao et al. | |
| 2014/0342769 A1 | 11/2014 | Pan et al. | |
| 2020/0037269 A1* | 1/2020 | Ryu | H04W 52/365 |

FOREIGN PATENT DOCUMENTS

| | | |
|---|---|---|
| CN | 101741437 A | 6/2010 |
| CN | 104717738 A | 6/2015 |
| CN | 105052065 A | 11/2015 |
| CN | 105578409 A | 5/2016 |
| CN | 108270532 A | 7/2018 |
| CN | 109923929 A | 6/2019 |
| CN | 110636626 A | 12/2019 |
| CN | 110858801 A | 3/2020 |
| CN | 110891305 A | 3/2020 |
| EP | 3592048 A1 | 1/2020 |

OTHER PUBLICATIONS

3GPP TS 38.214 V16.1.0 (Mar. 2020), 3rd Generation Partnership Project;Technical Specification Group Radio Access Network;NR;Physical layer procedures for data(Release 16), 151 pages.
3GPP TS 38.413 V16.1.0 (Mar. 2020), 3rd Generation Partnership Project; Technical Specification Group Radio Access Network;NG-RAN;NG Application Protocol (NGAP)(Release 16), 341 pages.

* cited by examiner

POWER ADJUSTMENT METHOD, APPARATUS, AND SYSTEM

CROSS-REFERENCE TO RELATED APPLICATIONS

This application is a continuation of International Application No. PCT/CN2021/082494, filed on Mar. 23, 2021, which claims priority to Chinese Patent Application No. 202010323558.9, filed on Apr. 22, 2020. The disclosures of the aforementioned applications are hereby incorporated by reference in their entireties.

TECHNICAL FIELD

This disclosure relates to the field of satellite communication, and in particular, to a power adjustment method, apparatus, and system.

BACKGROUND

A satellite communication system and a terrestrial 5th generation (5G) mobile network are mutually integrated to jointly form a sea-land-air-space integrated communication network with seamless global coverage, to meet a plurality of ubiquitous service requirements of users. This is an important development direction of future communication.

A power amplifier component of a base station deployed on a satellite has large rated power. When a satellite communication system is integrated with 5G, non-linear impact of the power amplifier is more prominent, resulting in out-of-band leakage and in-band carrier interference, and increasing inter-cell interference. Therefore, power back-off of this type of base station is inevitable, and it is necessary to design a proper solution to implement power back-off of this type of base station.

SUMMARY

Embodiments of this disclosure provide a power adjustment method, apparatus, and system, to reduce out-of-band leakage, improve in-band signal quality, and reduce inter-cell interference, to improve cell throughput.

To achieve the foregoing objectives, the following technical solutions are used in embodiments of this disclosure.

According to a first aspect, a power adjustment method is provided. The method may be applied to a satellite communication system. The method may be performed by a terminal device, or may be performed by a component of the terminal device, for example, a processor, a chip, or a chip system of the terminal device. In this disclosure, an example in which the terminal device performs the method is used for description. The method includes: A terminal device determines a large-scale loss difference. The large-scale loss difference is a difference between a large-scale loss at a first moment and a large-scale loss at a second moment. The second moment is earlier than the first moment. The terminal device sends the large-scale loss difference or an index of the large-scale loss difference to a first access network device.

Based on this solution, because the terminal device may indicate the large-scale loss difference to the first access network device, the first access network device can obtain a power back-off value based on the large-scale loss difference, and complete output power adjustment or back-off based on the power back-off value, to reduce out-of-band leakage, improve in-band signal quality, and reduce inter-cell interference, to improve cell throughput.

In a possible design, that the terminal device determines the large-scale loss difference may include: The terminal device determines the large-scale loss difference based on at least one of the following: an ephemeris of the first access network device, direction information of a beam of the first access network device, weather information within a beam range, or geographical location information of the beam range.

Based on this solution, the terminal device can determine the large-scale loss difference based on the at least one parameter without measuring a downlink signal. This can reduce power consumption of the terminal device.

In a possible design, that the terminal device determines the large-scale loss difference may include: The terminal device obtains signal quality information at the second moment, and determines the large-scale loss at the second moment based on the signal quality information at the second moment. The terminal device obtains signal quality information at the first moment, and determines the large-scale loss at the first moment based on the signal quality information at the first moment. The terminal device determines the difference between the large-scale loss at the first moment and the large-scale loss at the second moment as the large-scale loss difference.

Based on this solution, the terminal device may determine the large-scale loss difference. This can improve accuracy of the obtained large-scale loss difference, to improve precision of power adjustment of the first access network device.

According to a second aspect, a power adjustment method is provided. The method may be applied to a satellite communication system. The method may be performed by a first access network device, or may be performed by a component of the first access network device, for example, a processor, a chip, or a chip system of the first access network device. In this disclosure, an example in which the first access network device performs the method is used for description. The method includes: A first access network device obtains a first power back-off value. The first power back-off value is a power back-off value at a first moment. When a difference between a second power back-off value and the first power back-off value is greater than or equal to a first threshold, the first access network device adjusts an output power based on the first power back-off value. The second power back-off value is a power back-off value at a second moment. The second moment is earlier than the first moment.

Based on this solution, on one hand, the first access network device can complete output power adjustment or back-off, to reduce out-of-band leakage, improve in-band signal quality, and reduce inter-cell interference, to improve cell throughput. On the other hand, the first access network device adjusts an output power of the first access network device only when the difference between the power back-off value at the second moment and the power back-off value at the first moment is greater than a threshold. This can prevent the first access network device from frequently adjusting a power.

In a possible design, that the first access network device adjusts the output power based on the first power back-off value may include: The first access network device determines a first output power based on the first power back-off value, and adjusts an output power of the first access network device to the first output power.

In a possible design, the power adjustment method further includes: The first access network device determines a large-scale loss difference. The large-scale loss difference is a difference between a large-scale loss at the first moment and a large-scale loss at the second moment. That the first access network device obtains the first power back-off value includes: The first access network device determines the first power back-off value based on the large-scale loss difference.

Based on this possible design, the first access network device may autonomously complete calculation of the first power back-off value without assistance of another device. This can improve flexibility of obtaining the power back-off value.

In a possible design, that the first access network device determines the large-scale loss difference includes: The first access network device determines the large-scale loss difference based on at least one of the following: an ephemeris of the first access network device, direction information of a beam of the first access network device, weather information within a beam range, or geographical location information of the beam range.

In a possible design, the large-scale loss difference and the first power back-off value satisfy the following formula:

$$OBO_{t1}=P_{max}-P_{t2}-\Delta PL_{t1}.$$

$OBO_{t1}$ is the first power back-off value, $P_{max}$ is a maximum output power of the first access network device, $P_{t2}$ is an output power at the second moment, and $\Delta PL_{t1}$ is the large-scale loss difference.

In a possible design, that the first access network device obtains the first power back-off value includes: The first access network device determines the first power back-off value based on a first modulation and coding scheme MCS and a correspondence between an MCS and a power back-off value. The first MCS is an MCS used by the first access network device from the first moment.

Based on this possible design, the first access network device may obtain the first power back-off value based on the correspondence between the MCS and the power back-off value, and does not need to perform calculation based on a parameter. This can reduce a delay in obtaining the power back-off value, and can further reduce calculation complexity of the first access network device.

In a possible design, that the first access network device determines the first power back-off value based on the large-scale loss difference includes: The first access network device determines a third power back-off value based on the large-scale loss difference. The first access network device determines a fourth power back-off value based on a first MCS and a correspondence between an MCS and a power back-off value. The first MCS is an MCS used by the first access network device from the first moment. The first access network device determines the first power back-off value based on the third power back-off value and the fourth power back-off value.

Based on this possible design, the foregoing two manners of obtaining the first power back-off value may be combined to optimally combine the two manners, to obtain a more proper optimal power back-off value, so as to improve accuracy of power back-off.

In a possible design, the large-scale loss difference and the third power back-off value satisfy the following formula:

$$OBO_3=P_{max}-P_{t2}-\Delta PL_{t1}.$$

$OBO_3$ is the third power back-off value, $p_{max}$ is a maximum output power of the first access network device, $P_{t2}$ is an output power at the second moment, and $\Delta PL_{t1}$ is the large-scale loss difference.

In a possible design, the first power back-off value, the third power back-off value, and the fourth power back-off value satisfy the following formula:

$$OBO_{t1}=\max(OBO_3,OBO_4)$$

$OBO_{t1}$ is the first power back-off value, $OBO_3$ is the third power back-off value, $OBO_4$ is the fourth power back-off value, and max(x,y) represents a maximum value in x and Y.

Alternatively, the first power back-off value, the third power back-off value, and the fourth power back-off value satisfy the following formula:

$$OBO_{t1}=\alpha OBO_3+\beta OBO_4$$

$OBO_{t1}$ is the first power back-off value, $OBO_3$ is the third power back-off value, $OBO_4$ is the fourth power back-off value, and $0\leq\alpha\leq1$, $0\leq\beta\leq1$, $\alpha+\beta=1$.

In a possible design, that the first access network device obtains the first power back-off value includes: The first access network device receives the first power back-off value from a control device.

Based on this possible implementation, the first access network device does not need to perform calculation or table lookup by itself to obtain the first power back-off value. This can reduce calculation complexity of the first access network device.

In a possible design, before the first access network device obtains the first power back-off value, the power adjustment method further includes: The first access network device receives indication information. That the first access network device obtains the first power back-off value includes: The first access network device obtains the first power back-off value when the indication information indicates the first access network device to adjust a power.

In a possible design, that the first access network device obtains the first power back-off value includes: The first access network device obtains the first power back-off value when a coverage scope of the beam of the first access network device does not change with movement of the first access network device.

In a possible design, that the first access network device obtains the first power back-off value includes: The first access network device obtains the first power back-off value when a coverage scope of the beam of the first access network device changes.

According to a third aspect, a communication apparatus is provided, to implement the foregoing methods. The communication apparatus may be the terminal device in the first aspect, or an apparatus including the terminal device, or an apparatus such as a chip included in the terminal device. Alternatively, the communication apparatus may be the first access network device in the second aspect, or an apparatus including the first access network device, or an apparatus included in the first access network device. The communication apparatus includes a corresponding module, unit, or means (means) for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the terminal device in the first aspect, or an apparatus including the terminal device, or an apparatus such as a chip included in the terminal device. Alternatively, the communication apparatus may be the first access network device in the second aspect, or an apparatus including the first access network device, or an apparatus included in the first access network device.

According to a fifth aspect, a communication apparatus is provided, including an interface circuit and a logic circuit. The interface circuit may be a code/data read and write interface circuit. The interface circuit is configured to obtain to-be-processed data and/or output processed data. The processor is configured to perform the method according to any one of the foregoing aspects, to process the to-be-processed data and/or generate the processed data. The communication apparatus may be the terminal device in the first aspect, or an apparatus including the terminal device, or an apparatus such as a chip included in the terminal device. Alternatively, the communication apparatus may be the first access network device in the second aspect, or an apparatus including the first access network device, or an apparatus included in the first access network device.

According to a sixth aspect, a communication apparatus is provided, including a processor. The processor is configured to: be coupled to a memory, and after reading instructions in the memory, perform the method according to any one of the foregoing aspects based on the instructions. The communication apparatus may be the terminal device in the first aspect, or an apparatus including the terminal device, or an apparatus such as a chip included in the terminal device. Alternatively, the communication apparatus may be the first access network device in the second aspect, or an apparatus including the first access network device, or an apparatus included in the first access network device.

According to a seventh aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the terminal device in the first aspect, or an apparatus including the terminal device, or an apparatus such as a chip included in the terminal device. Alternatively, the communication apparatus may be the first access network device in the second aspect, or an apparatus including the first access network device, or an apparatus included in the first access network device.

According to an eighth aspect, a computer program product including instructions is provided. When the computer program product runs on a communication apparatus, the communication apparatus is enabled to perform the method according to any one of the foregoing aspects. The communication apparatus may be the terminal device in the first aspect, or an apparatus including the terminal device, or an apparatus such as a chip included in the terminal device. Alternatively, the communication apparatus may be the first access network device in the second aspect, or an apparatus including the first access network device, or an apparatus included in the first access network device.

According to a ninth aspect, a communication apparatus is provided (for example, the communication apparatus may be a chip or a chip system). The communication apparatus includes a processor, configured to implement a function in any one of the foregoing aspects. In a possible design, the communication apparatus further includes a memory. The memory is configured to store necessary program instructions and data. When the communication apparatus is a chip system, the communication apparatus may include a chip, or may include a chip and another discrete component.

For technical effects brought by any one of the designs of the third aspect to the ninth aspect, refer to technical effects brought by different designs of the first aspect or the second aspect. Details are not described herein again.

According to a tenth aspect, a communication system is provided. The communication system includes the terminal device in the foregoing aspects and the first access network device in the foregoing aspects.

DESCRIPTION OF EMBODIMENTS

Figure 1:
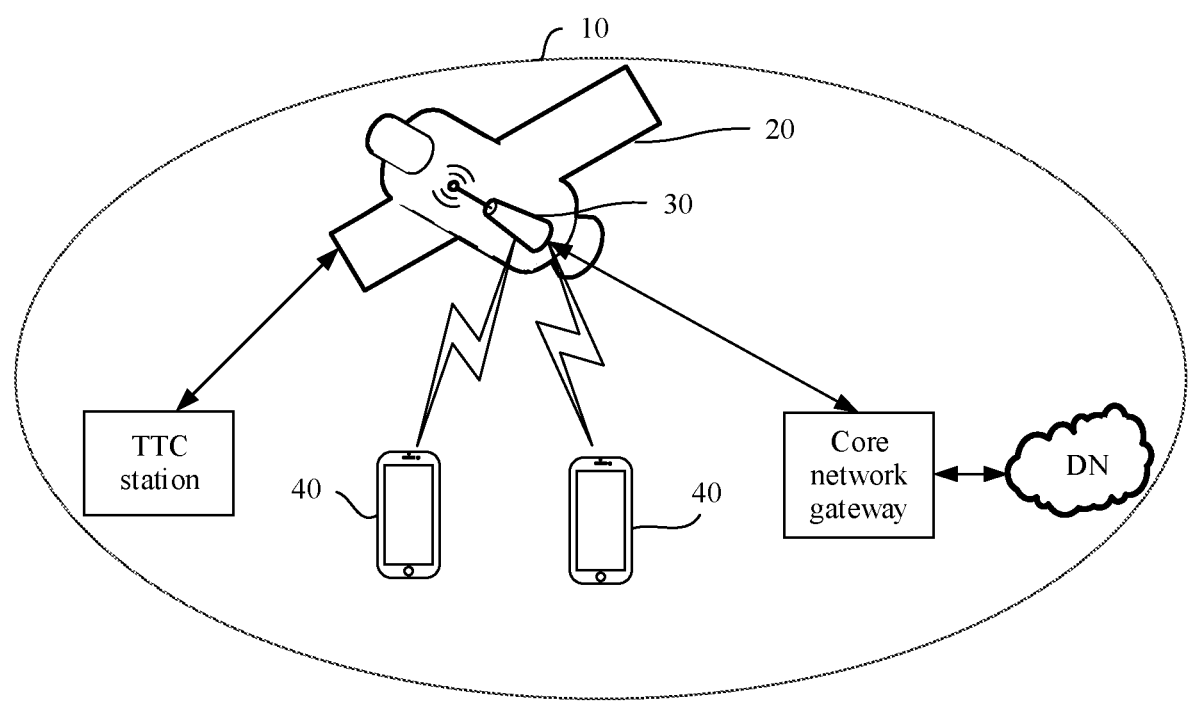
FIG. 1 is a schematic diagram of a structure of a communication system according to an embodiment of this disclosure.

For ease of understanding of the technical solutions in embodiments of this disclosure, the technologies related to this disclosure are first briefly described as follows.

Satellite Communication

Satellite communication has prominent advantages such as global coverage, long-distance transmission, flexible networking, convenient deployment, and being not restricted by geographical locations, and has been widely applied to a plurality of fields such as maritime communication, positioning and navigation, disaster relief, scientific experiments, video broadcasting, and earth observation.

Based on a satellite altitude, namely, a satellite orbit altitude, satellites may be classified into highly elliptical orbit (HEO) satellites, high earth orbit (geostationary earth orbit, GEO) satellites, medium earth orbit (MEO) satellites, and low earth orbit (LEO) satellites. The GEO satellite is also referred to as a stationary satellite, and a moving speed of the GEO satellite is the same as a rotation speed of the earth. Therefore, the GEO satellite remains stationary relative to ground. Correspondingly, a cell of the GEO satellite is also stationary. Coverage of a GEO satellite cell is large. Generally, a diameter of the cell is 500 km. The LEO satellite moves fast relative to ground, at a speed of about 7 km/s. Therefore, a service coverage area provided by the LEO satellite also moves.

In addition, high altitude platform (high altitude platform station, HAPS) communication is a communication technology similar to satellite communication. In the HAPS communication, a base station or some functions of a base station is/are deployed on a high altitude platform. A HAPS communication system and a satellite communication system may be collectively referred to as a non-terrestrial network (NTN).

The following describes the technical solutions in embodiments of this disclosure with reference to the accompanying drawings in embodiments of this disclosure. In the descriptions of this disclosure, unless otherwise specified, "/" indicates an "or" relationship between associated objects. For example, AB may indicate A or B. In this disclosure, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this disclosure, unless otherwise specified, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where "-" indicates that associated objects are in an "and" relationship, and a, b, or c may be singular or plural. In addition, to clearly describe the technical solutions in embodiments of this disclosure, terms such as "first" and "second" are used in embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this disclosure may be applied to various communication systems, for example, an orthogonal frequency division multiple access (OFDMA), a single carrier frequency division multiple access (single carrier FDMA, SC-FDMA), a satellite communication system, an NTN system, and another system. Terms "system" and "network" can be interchanged with each other. In addition, the communication systems may be further used in future-oriented communication technologies, and are all used in the technical solutions provided in embodiments of this disclosure. The foregoing communication systems applicable to this disclosure are merely examples for descriptions, and the communication systems applicable to this disclosure are not limited thereto. This is uniformly described herein, and details are not described below again.

FIG. 1 shows a communication system 10 according to an embodiment of this disclosure. The communication system 10 includes a first access network device 30, and one or more terminal devices 40 connected to the first access network device 30. Optionally, different terminal devices 40 may communicate with each other.

Optionally, the first access network device 30 in this embodiment of this disclosure may be deployed on a high altitude platform or a satellite 20. Optionally, the communication system 10 may further include a TTC station and a core network gateway. The first access network device 30 may be connected to the core network gateway, and exchange data with a terrestrial data network (DN) through the core network gateway. The TTC station is configured to complete measurement, telemetering, and the like for the high altitude platform or the satellite 20, for example, control a flight attitude of the high altitude platform or the satellite 20, and control a switch of a load device.

Optionally, the first access network device 30 in this embodiment of this disclosure is a device that enables the terminal device 40 to access a wireless network, and may be an evolved NodeB (eNB or eNodeB) in LTE, a base station in a 5G network or a future evolved public land mobile network (PLMN), a broadband network service gateway (broadband network gateway, BNG), an aggregation switch, a non-3rd generation partnership project (3GPP) access device, or the like. This is not specifically limited in this embodiment of this disclosure. Optionally, the base station in this embodiment of this disclosure may include various forms of base stations, for example, a macro base station, a micro base station (also referred to as a small cell), a relay station, an access point, a next-generation NodeB (gNodeB, gNB), a home base station (for example, a home evolved NodeB or a home NodeB, HNB), a baseband unit (BBU), a transmitting and receiving point (transmitting and receiving point, TRP), a transmitting point (TP), and a mobile switching center. This is not specifically limited in this embodiment of this disclosure.

In a possible manner, the first access network device 30 in this embodiment of this disclosure may alternatively be a central unit (CU), a distributed unit (DU), or a network device may include a CU and a DU. It may be understood that the base station is divided into the CU and the DU from the perspective of a logical function. The CU and the DU may be physically separated, or may be deployed together. This is not specifically limited in this embodiment of this disclosure. The CU and the DU may be connected through an interface, for example, an F1 interface. The CU and the DU may be obtained through division based on protocol layers of a wireless network. For example, functions of a radio resource control (RRC) protocol layer, a service data adaptation protocol (SDAP) protocol layer, and a packet data convergence protocol (PDCP) protocol layer are set in the CU, and functions of a radio link control (RLC) protocol layer, a media access control (MAC) protocol layer, a physical (PHY) protocol layer, and the like are set in the DU. It may be understood that, division into processing functions of the CU and the DU based on the protocol layers is merely an example, and the processing functions of the CU and the DU may alternatively be divided in another manner. This is not specifically limited in this embodiment of this disclosure.

Optionally, the CU may include a CU control plane (CU-CP) and a CU user plane (CU-UP). It may be understood that the CU is divided into the CU-CP and the CU-UP by logical functions. The CU-CP and the CU-UP may be divided based on a protocol layer of a wireless network. For example, a function of the RRC protocol layer and a function that is of the PDCP protocol layer and that corresponds to a signal radio bearer (SRB) are set in the CU-CP, and a function that is of the PDCP protocol layer and that corresponds to a data radio bearer (DRB) is set in the CU-UP. In addition, the function of the SDAP protocol layer may also be set in the CU-UP.

Optionally, the terminal device 40 in this embodiment of this disclosure may be a device such as a terminal or a chip that may be used in the terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control (industrial control), a wireless terminal in self driving, a wireless terminal in telemedicine, a wireless terminal in a smart grid (smart grid), a wireless terminal in transportation safety, a wireless terminal in a smart city, a wireless terminal in a smart home (smart home), or the like. The terminal may be mobile or fixed.

Optionally, the first access network device 30 and the terminal device 40 in this embodiment of this disclosure may also be referred to as communication apparatuses, and each may be a general-purpose device or a dedicated device. This is not specifically limited in this embodiment of this disclosure.

Figure 2:
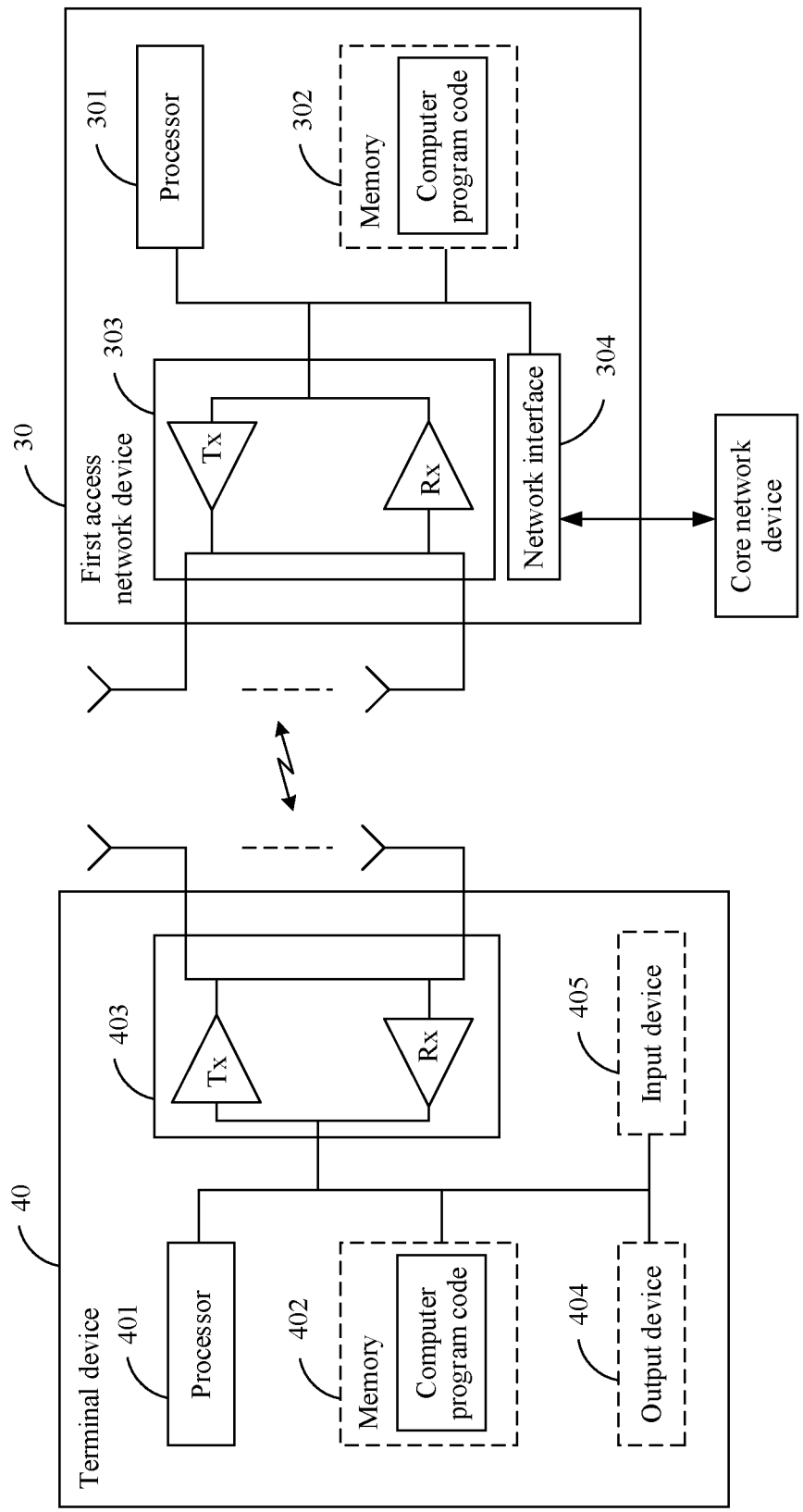
FIG. 2 is a schematic diagram of structures of a terminal device and a first access network device according to an embodiment of this disclosure.

Optionally, FIG. 2 is a schematic diagram of structures of the first access network device 30 and the terminal device 40 according to an embodiment of this disclosure.

The terminal device 40 includes at least one processor (an example in which one processor 401 is included is used for description in FIG. 2) and at least one transceiver (an example in which one transceiver 403 is included is used for description in FIG. 2). Optionally, the terminal device 40 may further include at least one memory (an example in which one memory 402 is included is used for description in FIG. 2), at least one output device (an example in which one output device 404 is included is used for description in FIG. 2), and at least one input device (an example in which one input device 405 is included is used for description in FIG. 2).

The processor 401, the memory 402, and the transceiver 403 are connected to each other through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. In specific implementation, in an embodiment, the processor 401 may also include a plurality of CPUs, and the processor 401 may be a single-core (single-CPU) processor or a multi-core (multi-CPU) processor. The processor herein may refer to one or more devices, circuits, or processing cores configured to process data (for example, computer program instructions).

The memory 402 may be an apparatus having a storage function. For example, the memory 402 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic storage medium or another magnetic storage device, or any other medium that can be used to carry or store expected program code in a form of an instruction or a data structure and that can be accessed by a computer. However, this is not limited thereto. The memory 402 may exist independently, and is connected to the processor 401 through the communication line. The memory 402 may alternatively be integrated with the processor 401.

The memory 402 is configured to store computer-executable instructions for performing the solutions in this disclosure, and the processor 401 controls execution of the computer-executable instructions. Specifically, the processor 401 is configured to execute the computer-executable instruction stored in the memory 402, to implement the power adjustment method in the embodiments of this disclosure. Optionally, the computer-executable instructions in this embodiment of this disclosure may also be referred to as application program code or computer program code. This is not specifically limited in this embodiment of this disclosure.

The transceiver 403 may use any apparatus such as a transceiver, and is configured to communicate with another device or a communication network, for example, the Ethernet, a RAN, or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector (projector), or the like.

The input device 405 communicates with the processor 401, and may receive an input of a user in a plurality of manners. For example, the input device 405 may be a mouse, a keyboard, a touchscreen device, or a sensor device.

The first access network device 30 includes at least one processor (an example in which one processor 301 is included is used for description in FIG. 2), at least one transceiver (an example in which one transceiver 303 is included is used for description in FIG. 2), and at least one network interface (an example in which one network interface 304 is included is used for description in FIG. 2). Optionally, the first access network device 30 may further include at least one memory (an example in which one memory 302 is included is used for description in FIG. 2). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 2). This is not specifically limited in this embodiment of this disclosure. In addition, for descriptions about the processor 301, the memory 302, and the transceiver 303, refer to descriptions about the processor 401, the memory 402, and the transceiver 403 in the terminal device 40. Details are not described again herein.

Figure 3:
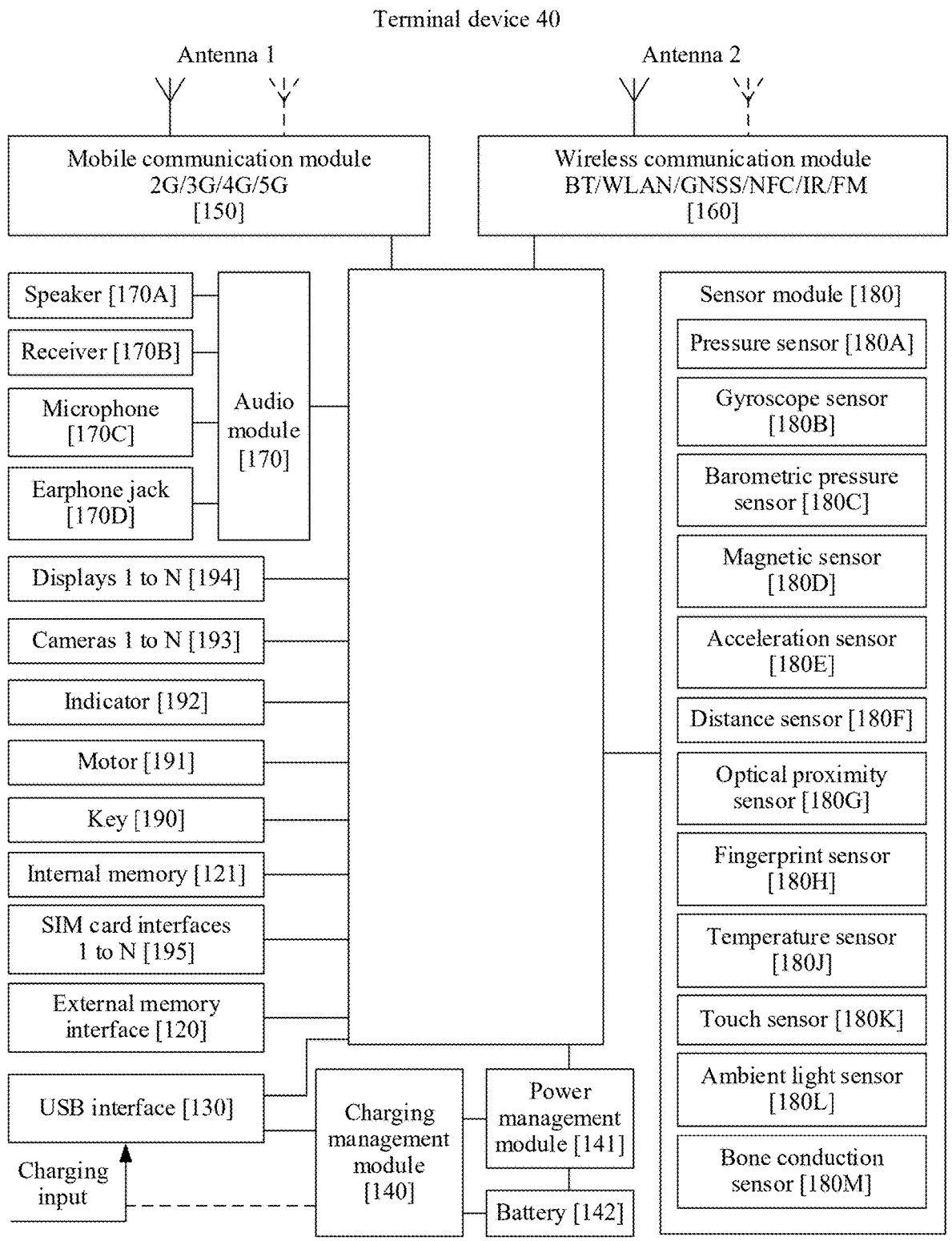
FIG. 3 is a schematic diagram of a structure of another terminal device according to an embodiment of this disclosure.

With reference to the schematic diagram of the structure of the terminal device 40 shown in FIG. 2, for example, FIG. 3 is a specific structural form of the terminal device 40 according to an embodiment of this disclosure.

In some embodiments, a function of the processor 401 in FIG. 2 may be implemented by a processor 110 in FIG. 3.

In some embodiments, a function of the transceiver 403 in FIG. 2 may be implemented through an antenna 1, an antenna 2, a mobile communication module 150, a wireless communication module 160, and the like in FIG. 3.

The antenna 1 and the antenna 2 are configured to transmit and receive electromagnetic wave signals. Each antenna in the terminal device 40 may be configured to cover one or more communication frequency bands. Different antennas may be further reused, to improve antenna utilization. For example, the antenna 1 may be multiplexed as a diversity antenna of a wireless local area network. In some other embodiments, the antenna may be multiplexed in combination with a tuning switch.

The mobile communication module 150 may provide a solution used for wireless communication including 2G, 3G, 4G, 5G, and the like on the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a solution used for wireless communication including a wireless local area network WLAN) (for example, a Wi-Fi network), Bluetooth (BT), a global navigational satellite system (GNSS), frequency modulation (FM), near field communication (NFC), an infrared (IR) technology, and the like on the terminal device 40. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. When the terminal device 40 is a first device, that the wireless communication module 160 may provide a solution used for NFC wireless communication on the terminal device 40 means that the first device includes an NFC chip. The NFC chip may improve an NFC wireless communication function. When the terminal device 40 is a second device, that the wireless communication module 160 may provide a solution used for NFC wireless communication on the terminal device 40 means that the first device includes an electronic label (for example, a radio frequency identification (RFID) label). When approaching the electronic tag, an NFC chip of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (time-division code division multiple access, TD-SCDMA), LTE, BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), or a satellite based augmentation system (satellite based augmentation system, SBAS).

In some embodiments, a function of the memory 402 in FIG. 2 may be implemented by an internal memory 121 in FIG. 3, an external memory (for example, a Micro SD card) connected to an external memory interface 120, or the like.

In some embodiments, a function of the output device 404 in FIG. 2 may be implemented by a display 194 in FIG. 3. The display 194 is configured to display an image, a video, and the like. The display 194 includes a display panel.

In some embodiments, a function of the input device 405 in FIG. 2 may be implemented by a mouse, a keyboard, a touchscreen device, or a sensor module 180 in FIG. 3. For example, as shown in FIG. 3, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 3, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (also referred to as a "loudspeaker"), a telephone receiver 170B (also referred to as a "handset"), a microphone 170C (also referred to as a "mic" or "mike"), an earphone jack 170D, or the like. This is not specifically limited in this embodiment of this disclosure.

It may be understood that the structure shown in FIG. 3 constitute no specific limitation on the terminal device 40. For example, in some other embodiments of this disclosure, the terminal device 40 may include more or fewer components than those shown in the figure, or some components may be combined, some components may be split, or the components may be differently arranged. The components shown in the figure may be implemented by hardware, software, or a combination of software and hardware.

Figure 4:
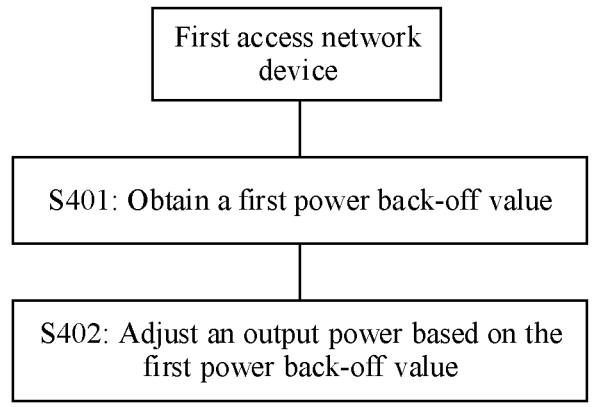
FIG. 4 is a schematic flowchart of a power adjustment method according to an embodiment of this disclosure.

With reference to the accompanying drawings, the following describes in detail the power adjustment method provided in embodiments of this disclosure by using an example in which the first access network device 30 shown in FIG. 4 interacts with any terminal device 40.

It should be noted that names of messages between network elements, names of parameters in the messages, or the like in the following embodiments of this disclosure are merely examples, and there may be other names in a specific implementation. This is not specifically limited in this embodiment of this disclosure.

It may be understood that in embodiments of this disclosure, a terminal device and/or a first access network device may perform some or all steps in embodiments of this disclosure. These steps or the operations are merely examples. In embodiments of this disclosure, other operations or variations of various operations may be further performed. In addition, the steps may be performed in a sequence different from a sequence presented in embodiments of this disclosure, and not all operations in embodiments of this disclosure may be necessarily performed.

FIG. 4 shows a power adjustment method according to an embodiment of this disclosure. For example, the power adjustment method may be applied to a satellite communication system. The power adjustment method includes the following steps.

S401: A first access network device obtains a first power back-off value.

The first power back-off value is a power back-off value at a first moment.

Optionally, the first moment may be understood as a current moment. The power back-off value at the first moment may be an output power back-off (OBO) value that is of the first access network device and that is obtained by the first access network device at the first moment.

Optionally, the first access network device may start to perform the step S401 in a plurality of cases. In other words, there may be a plurality of trigger scenarios for performing the power adjustment method provided in this embodiment of this disclosure.

In a possible implementation, before the step S401, the first access network device receives indication information. In this case, that the first access network device obtains the first power back-off value may include: The first access network device obtains the first power back-off value when the indication information indicates the first access network device to adjust a power. In other words, the first access network device obtains the first power back-off value based on an indication.

Optionally, the indication information may be sent by a core network device to the first access network device. The core network device may be configured to assist the first access network device in exchanging data with a terrestrial data network. The core network device may be, for example, an access and mobility management function (AMF) network element.

Optionally, the indication information may be sent by a second access network device to the first access network device. The second access network device is an access network device deployed on a satellite or a high altitude platform different from that of the first access network device.

Optionally, the second access network device may send the indication information to the first access network device in different cases. For example:

A possible case is as follows: The first access network device has an excessively high output power, causing interference to service transmission of the second access network device. In this case, the second access network device may send the indication information to the first access network device, to indicate the first access network device to adjust a power.

Another possible case is as follows: A fixed geographical area on the ground is covered by a beam of the second access network device within a time period (an end moment of the time period is the first moment) before the first moment. Due to movement of the satellite or the high altitude platform, at the first moment, the geographical area is no longer covered by the beam of the second access network device, and is covered by a beam of the first access network device. In this case, if the second access network device determines, within the time period in which the beam of the second access network device covers the geographical area, that power adjustment needs to be performed, but the second access network device no longer covers the geographical area, the second access network device may send the indication information to the first access network device, and subsequently the first access network device adjusts a power of the first access network device.

In another possible implementation, that the first access network device obtains the first power back-off value may include: The first access network device obtains the first power back-off value when a coverage scope of a beam of the first access network device does not change with movement of the first access network device.

It may be understood that the movement of the first access network device may also be understood as movement of a satellite or a high altitude platform on which the first access network device is deployed.

Optionally, to ensure that the coverage scope of the beam of the first access network device does not change when the first access network device moves, the first access network device needs to adjust a beam direction of the first access network device, so that the coverage scope of the beam does not change. When the beam direction changes and the first access network device keeps moving, a distance between the first access network device and the terminal device, a free space loss, signal strength received by the terminal device, and the like may change. Therefore, the first access network device may need to obtain a power back-off value to adjust a power of the first access network device.

In still another possible implementation, that the first access network device obtains the first power back-off value may include: The first access network device obtains the first power back-off value when a coverage scope of a beam of the first access network device changes.

Optionally, a change in the coverage scope of the beam of the first access network device may be caused by a change in a beam direction of the first access network device or movement of the first access network device. In this case, a distance between the first access network device and the terminal device, a free space loss, signal strength received by the terminal device, and the like may change. Therefore, the first access network device may need to obtain a power back-off value to adjust a power of the first access network device.

S402: The first access network device adjusts an output power based on the first power back-off value.

Optionally, after obtaining the first power back-off value, the first access network device may compare the first power back-off value with a second power back-off value, and perform the step S402 when a difference between the second power back-off value and the first power back-off value is greater than or equal to a first threshold.

In other words, when the difference between the second power back-off value and the first power back-off value is greater than or equal to the first threshold, the first access network device adjusts the output power based on the first power back-off value. The second power back-off value is a power back-off value at a second moment. The second moment is earlier than the first moment.

Optionally, the second moment may be a moment that is closest to the first moment and at which the first access network device adjusts the output power. In other words, the second moment may be a moment at which the first access network device adjusts the output power last time. Alternatively, if the step S402 is first adjustment of the output power after the first access network device is powered on or restarted, the second moment may be any moment between the first moment and the moment at which the first access network device is powered on or restarted. Correspondingly, the second power back-off value is 0.

Optionally, the first threshold may be determined by the first access network device, or may be predefined in a protocol, or may be sent by the core network device or another device to the first access network device. This is not specifically limited in this embodiment of this disclosure.

Optionally, that the first access network device adjusts the output power based on the first power back-off value may include: The first access network device determines a first output power based on the first power back-off value, and then adjusts an output power of the first access network device to the first output power.

Optionally, the first power back-off value and the first output power may satisfy the following formula A:

$$P_{t1}=P_{max}-OBO_{t1}.$$

$OBO_{t1}$ is the first power back-off value, $P_{max}$ is a maximum output power of the first access network device, and $P_{t1}$ is the first output power.

Therefore, the first access network device may complete adjustment of the output power of the first access network device.

Based on this solution, on one hand, the first access network device can complete output power adjustment or back-off, to reduce out-of-band leakage, improve in-band signal quality, and reduce inter-cell interference, to improve cell throughput. On the other hand, the first access network device adjusts an output power of the first access network device only when the difference between the power back-off value at the second moment and the power back-off value at the first moment is greater than a threshold. This can prevent the first access network device from frequently adjusting a power.

The following describes a method for obtaining the first power back-off value by the first access network device in the step S401.

In a first possible implementation, the first access network device may first determine a large-scale loss difference, and then determine the first power back-off value based on the large-scale loss difference.

The large-scale loss difference is a difference between a large-scale loss at the first moment and a large-scale loss at the second moment.

Optionally, the first access network device may determine the large-scale loss difference based on at least one of the following: an ephemeris of the first access network device, direction information of the beam of the first access network device, weather information within a beam range of the beam, or geographical location information of the beam range of the beam.

Optionally, the ephemeris of the first access network device may also be understood as an ephemeris of the satellite or the high altitude platform on which the first access network device is deployed. The ephemeris of the first access network device may indicate a precise location or track of the first access network device that changes with time. The geographical location information of the beam range may indicate the geographical area covered by the beam, for example, may indicate central location coordinates of the geographical area and/or an area radius of the geographical area.

Optionally, the first access network device may alternatively determine the large-scale loss difference based on signal quality information reported by the terminal device. For example, the terminal device may measure a signal such as a channel-state information reference signal (CSI-RS), a synchronization signal/physical broadcast channel block (SSB), or a demodulation reference signal (DMRS), to obtain signal quality information, and report the signal quality information to the first access network device. The signal quality information may be, for example, a reference signal received power (RSRP).

Optionally, when the first access network device determines the first power back-off value based on the large-scale loss difference, the large-scale loss difference and the first power back-off value may satisfy the following formula B:

$$OBO_{t1}=P_{max}-P_{t2}-\Delta PL_{t1}.$$

$OBO_{t1}$ is the first power back-off value, $P_{max}$ is a maximum output power of the first access network device, $P_{t2}$ is an output power at the second moment, and $\Delta PL_{t1}$ is the large-scale loss difference.

Optionally, with reference to the formula A and the formula B, it may be obtained that the first output power and the large-scale loss difference satisfy the following formula C:

$$P_{t1}=P_{t2}+\Delta PL_{t1}.$$

It can be learned from the formula C that when the large-scale loss difference is greater than 0, it indicates that the large-scale loss at the first moment is greater than the large-scale loss at the second moment. To ensure communication performance of the first access network device, the first output power should be greater than the output power at the second moment. When the large-scale loss difference is less than 0, it indicates that the large-scale loss at the first moment is less than the large-scale loss at the second moment. In this case, the first output power may be adaptively reduced, that is, may be less than the output power at the second moment.

Based on this possible implementation, the first access network device may autonomously complete calculation of the first power back-off value without assistance of another device. This can improve flexibility of obtaining the power back-off value.

In a second possible implementation, the first access network device obtains the first power back-off value may include: The first access network device determines the first power back-off value based on a first modulation and coding scheme (MCS) and a correspondence between an MCS and a power back-off value.

The first MCS is an MCS used by the first access network device from the first moment.

In other words, before the first moment, the MCS used by the first access network device is not the first MCS. Optionally, the first access network device may dynamically adjust, based on channel quality and the like, the MCS used by the first access network device. When the MCS changes, to ensure communication performance, the first access network device may determine the power back-off value based on a change of the MCS, to perform power adjustment.

For example, the correspondence between the MCS and the power back-off value includes a correspondence shown in Table 1. If an index of the MCS used by the first access network device before the first moment is 19, and the first access network device starts to use an MCS whose index is 18 at the first moment, it may be obtained from Table 1 that in this case, the first power back-off value is 2.6 decibels (dBs).

TABLE 1

| MCS index | Optimum back-off value OBO (dB) |
|---|---|
| 18 | 2.6 |
| 19 | 3.1 |
| 20 | 3.1 |

Based on this possible implementation, the first access network device may obtain the first power back-off value based on the correspondence between the MCS and the power back-off value, and does not need to perform calculation based on a parameter. This can reduce a delay in obtaining the power back-off value, and can further reduce calculation complexity of the first access network device.

In a third possible implementation, the first access network device may obtain the first power back-off value with reference to the first possible implementation and the second possible implementation.

Optionally, the first access network device may determine the large-scale loss difference, and determine a third power back-off value based on the large-scale loss difference. Refer to related descriptions in the first implementation. The first access network device further determines a fourth power back-off value based on a first MCS and a correspondence between an MCS and a power back-off value. Refer to related descriptions in the second implementation. Finally, the first access network device determines the first power back-off value based on the third power back-off value and the fourth power back-off value.

Optionally, the large-scale loss difference and the third power back-off value satisfy the following formula D:

$$OBO_3 = P_{max} - P_{t2} - \Delta PL_{t1}.$$

$OBO_3$ is the third power back-off value, $P_{max}$ is a maximum output power of the first access network device, $P_{t2}$ is an output power at the second moment, and $\Delta PL_{t1}$ is the large-scale loss difference.

Optionally, the first power back-off value, the third power back-off value, and the fourth power back-off value may satisfy the following formula E:

$$OBO_{t1} = \max(OBO_3, OBO_4).$$

$OBO_{t1}$ is the first power back-off value, $OBO_3$ is the third power back-off value, $OBO_4$ is the fourth power back-off value, and max(x, y) represents a maximum value in x and Y.

Alternatively, the first power back-off value, the third power back-off value, and the fourth power back-off value may satisfy the following fourth formula F:

$$OBO_{t1} = \alpha OBO_3 + \beta OBO_4.$$

$OBO_{t1}$ is the first power back-off value, $OBO_3$ is the third power back-off value, $OBO_4$ is the fourth power back-off value, and $0 \leq \alpha \leq 1$, $0 \leq \beta \leq 1$, $\alpha + \beta = 1$.

Optionally, $\alpha$ and $\beta$ each contain one decimal place, in other words, values of $\alpha$ and $\beta$ each have only one digit after a decimal point. The digit may be 0. For example, a value of $\alpha$ may be 0.0, and a value of $\beta$ may be 1.0. In this case, the first power back-off value determined based on the third possible implementation is the same as the first power back-off value determined based on the foregoing second possible implementation. Alternatively, a value of $\alpha$ may be 0.4, and a value of $\beta$ may be 0.6. Alternatively, a value of $\alpha$ may be 0.5, and a value of $\beta$ may also be 0.5.

It may be understood that the foregoing values of $\alpha$ and $\beta$ are merely examples for description in this disclosure, and specific values of $\alpha$ and $\beta$ are not limited in this embodiment of this disclosure.

Optionally, values of $\alpha$ and $\beta$ may be predefined in a protocol, or may be determined by the first access network device, or may be indicated by the core network device to the first access network device. This is not specifically limited in this embodiment of this disclosure.

Based on this possible implementation, the foregoing two manners of obtaining the first power back-off value may be combined to optimally combine the two manners, to obtain a more proper optimal power back-off value, so as to improve accuracy of power back-off.

In a fourth possible implementation, that the first access network device obtains the first power back-off value may include: The first access network device receives the first power back-off value from a control device. Optionally, in different implementation scenarios of this embodiment of this disclosure, the control device may also be different.

In a possible implementation scenario, the control device may be the second access network device.

Optionally, the fixed geographical area on the ground is covered by the beam of the second access network device within the time period (the end moment of the time period is the first moment) before the first moment. Due to movement of the satellite or the high altitude platform, at the first moment, the geographical area is no longer covered by the beam of the second access network device, and is covered by the beam of the first access network device. In this case, if the second access network device determines, within the time period in which the beam of the second access network device covers the geographical area, that power adjustment needs to be performed, and has calculated the first power back-off value, but the second access network device no longer covers the geographical area, the second access network device may send the first power back-off value to the first access network device, and subsequently the first access network device adjusts a power of the first access network device based on the first power back-off value.

Optionally, the second access network device may send the first power back-off value to the first access network device by using an existing message, or may send the first power back-off value to the first access network device by using a newly defined message. The newly defined message may be, for example, a power configuration update (POWER_CONFIGURATION_UPDATE) message. The newly defined message may include a maximum power back-off (Max Transmit Power Back-off) field to indicate the first power back-off value. This is not specifically limited in this embodiment of this disclosure.

Optionally, a method for calculating the first power back-off value by the second access network device may be similar to the method for obtaining the first power back-off value by the first access network device in the first possible implementation, or may be another method. This is not specifically limited in this embodiment of this disclosure.

In another possible implementation scenario, the control device may be the core network device (for example, the AMF network element).

Optionally, the core network device may calculate the first power back-off value, and send the first power back-off value calculated by the core network device to the first access network device.

Optionally, the core network device may send the first power back-off value to the first access network device by using the existing message. For example, a field is added to the existing message to represent the first power back-off value. For example, the core network device is the AMF network element. The AMF network element may add a maximum power back-off (Max Transmit Power Back-off) field to an existing access and mobility management function configuration update (AMF CONFIGURATION UPDATE) message to indicate the first power back-off value.

Alternatively, the core network device may send the first power back-off value to the first access network device by using a newly defined message. The newly defined message may be, for example, a radio access network configuration update (RAN_CONFIGURATION_UPDATE) message. The newly defined message may include a maximum power back-off (Max Transmit Power Back-off) field to indicate the first power back-off value. This is not specifically limited in this embodiment of this disclosure.

Based on this possible implementation, the first access network device does not need to perform calculation or table lookup by itself to obtain the first power back-off value. This can reduce calculation complexity of the first access network device.

Figure 5:
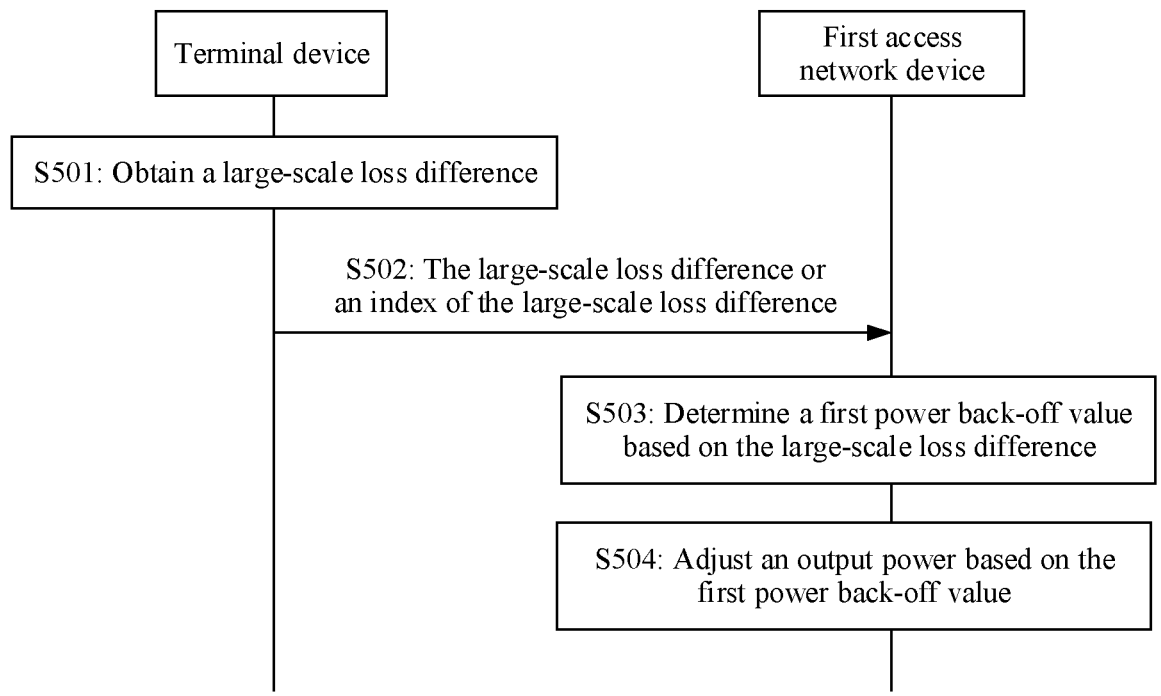
FIG. 5 is a schematic flowchart of another power adjustment method according to an embodiment of this disclosure.

Optionally, FIG. 5 shows another power adjustment method according to an embodiment of this disclosure. For example, the power adjustment method may be applied to a satellite communication system. The power adjustment method includes the following steps.

S501: A terminal device determines a large-scale loss difference.

The large-scale loss difference is a difference between a large-scale loss at a first moment and a large-scale loss at a second moment. For the first moment and the second moment, refer to related descriptions in the embodiment shown in FIG. 4. Details are not described herein again.

Optionally, the terminal device may obtain the large-scale loss difference in a plurality of manners.

In a possible implementation, that the terminal device determines the large-scale loss may include: The terminal device determines the large-scale loss difference based on at least one of the following: an ephemeris of the first access network device, direction information of a beam of the first access network device, weather information within a beam range of the beam, or geographical location information of the beam range of the beam. For descriptions of related parameters, refer to related descriptions in the embodiment shown in FIG. 4. Details are not described herein again.

In another possible implementation, that the terminal device determines the large-scale loss may include: The terminal device obtains signal quality information at the second moment, and determines the large-scale loss at the second moment based on the signal quality information at the second moment. The terminal device obtains signal quality information at the first moment, and determines the large-scale loss at the first moment based on the signal quality information at the first moment. The terminal device determines the difference between the large-scale loss at the first moment and the large-scale loss at the second moment as the large-scale loss difference.

Optionally, the signal quality information at the second moment may be obtained by the terminal device at the second moment by measuring downlink reference information. The signal quality information at the first moment may be obtained by the terminal device at the first moment by measuring the downlink reference information.

Optionally, the signal quality information may be one or more of a received signal code power (RSCP), an RSRP, or reference signal received quality (RSRQ).

S502: The terminal device sends the large-scale loss difference or an index of the large-scale loss difference to the first access network device. Correspondingly, the first access network device receives the large-scale loss difference or the index of the large-scale loss difference from the terminal device.

Optionally, if the terminal device sends the index of the large-scale loss difference to the first access network device, after receiving the index, the first access network device may determine the large-scale loss difference by using the index.

S503: The first access network device determines a first power back-off value based on the large-scale loss difference.

A relationship between the large-scale loss difference and the first power back-off value may satisfy the foregoing formula B. Refer to the foregoing related descriptions. Details are not described herein again.

Optionally, in the steps S502 to S503, an action performed by the first access network device may be understood as an action of obtaining the first power back-off value by the first access network device.

S504: The first access network device adjusts an output power based on the first power back-off value.

The step S504 is the same as the step S402. Refer to related descriptions in the step S402. Details are not described herein again.

Based on this solution, on one hand, because the terminal device may indicate the large-scale loss difference to the first access network device, the first access network device can obtain a power back-off value based on the large-scale loss difference, and complete output power adjustment or back-off based on the power back-off value, to reduce out-of-band leakage, improve in-band signal quality, and reduce inter-cell interference, to improve cell throughput. On the other hand, the first access network device adjusts an output power of the first access network device only when a difference between a power back-off value at the second moment and a power back-off value at the first moment is greater than a threshold. This can prevent the first access network device from frequently adjusting a power.

In the embodiment shown in FIG. 4 or FIG. 5, the processor 301 in the first access network device 30 shown in FIG. 2 may invoke application program code stored in the memory 302, to indicate the first access network device to perform the action performed by the first access network device. In the embodiment shown in FIG. 4 or FIG. 5, the processor 401 in the terminal device 40 shown in FIG. 2 may invoke application program code stored in the memory 402, to indicate the terminal device to perform an action performed by the terminal device. This is not limited in this embodiment.

In embodiments of this disclosure, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that, in the foregoing embodiments, methods and/or steps implemented by the terminal device may also be implemented by a component (for example, a chip or a circuit) that can be used in the terminal device, and methods and/or steps implemented by the first access network device may also be implemented by a component (for example, a chip or a circuit) that can be used in the first access network device.

The foregoing mainly describes the solutions provided in embodiments of this disclosure from a perspective of interaction between network elements. Correspondingly, an embodiment of this disclosure further provides a communication apparatus. The communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the first access network device in the foregoing method embodiments, or an apparatus including the foregoing first access network device, or a component that can be used in the first access network device. It may be understood that, to implement the foregoing functions, the communication apparatus includes a corresponding hardware structure and/or software module for performing each function. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, module division is an example, and is merely a logical function division. In actual implementation, another division manner may be used.

Figure 6:
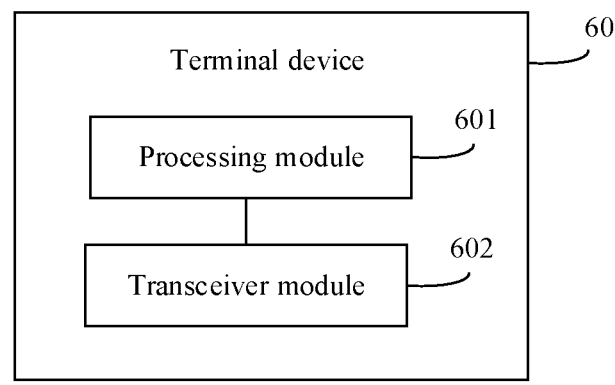
FIG. 6 is a schematic diagram of a structure of a terminal device according to an embodiment of this disclosure.

For example, the communication apparatus is the terminal device in the foregoing method embodiments. FIG. 6 is a schematic diagram of a structure of a terminal device 60. The terminal device 60 includes a processing module 601 and a transceiver module 602. The transceiver module 602 may also be referred to as a transceiver unit, and is configured to implement a sending and/or receiving function. For example, the transceiver module 602 may be a transceiver circuit, a transceiver machine, a transceiver, or a communication interface.

Optionally, the transceiver module 602 may include a receiving module and a sending module, which are respectively configured to perform receiving and sending steps performed by the terminal device in the foregoing method embodiments. The processing module 601 may be configured to perform steps other than the receiving and sending steps performed by the terminal device in the foregoing method embodiments.

Optionally, in an implementation scenario of this embodiment of this disclosure, that the transceiver module 602 is configured to obtain information/messages may also be understood as that the transceiver module 602 is configured to receive the information/messages. That the transceiver module 602 is configured to output information/messages may also be understood as that the transceiver module 602 is configured to send the information/messages.

The processing module 601 is configured to determine a large-scale loss difference. The large-scale loss difference is a difference between a large-scale loss at a first moment and a large-scale loss at a second moment. The second moment is earlier than the first moment. The transceiver module 602 is configured to output the large-scale loss difference or an index of the large-scale loss difference. In other words, the transceiver module 602 is configured to send the large-scale loss difference or the index of the large-scale loss difference to a first access network device.

Optionally, that the processing module 601 is configured to determine the large-scale loss difference may include: The processing module 601 is configured to determine the large-scale loss difference based on at least one of the following: an ephemeris of the first access network device, direction information of a beam of the first access network device, weather information within a beam range, or geographical location information of the beam range.

Optionally, that the processing module 601 is configured to determine the large-scale loss difference may include: The processing module 601 is configured to: obtain signal quality information at the second moment, and determine the large-scale loss at the second moment based on the signal quality information at the second moment. The processing module 601 is configured to: obtain signal quality information at the first moment, and determine the large-scale loss at the first moment based on the signal quality information at the first moment. The processing module 601 is configured to determine the difference between the large-scale loss at the first moment and the large-scale loss at the second moment as the large-scale loss difference.

All related content of the steps in the foregoing method embodiments may be cited in function descriptions of the corresponding functional modules. Details are not described herein again.

In this embodiment, the terminal device 60 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the terminal device 60 may be in a form of the terminal device 40 shown in FIG. 2.

For example, the processor 401 in the terminal device 40 shown in FIG. 2 may invoke computer-executable instructions stored in the memory 402, to enable the terminal device 40 to perform the power adjustment method in the foregoing method embodiments.

Specifically, the processor 401 in the terminal device 40 shown in FIG. 2 may invoke the computer-executable instructions stored in the memory 402, to implement functions/implementation processes of the processing module 601 and the transceiver module 602 in FIG. 6. Alternatively, the processor 401 in the terminal device 40 shown in FIG. 2 may invoke the computer-executable instructions stored in the memory 402, to implement functions/implementation processes of the processing module 601 in FIG. 6, and the transceiver 403 in the terminal device 40 shown in FIG. 2 may implement functions/implementation processes of the transceiver module 602 in FIG. 6.

The terminal device 60 provided in this embodiment can perform the foregoing power adjustment method. Therefore, for a technical effect that can be achieved by the terminal device 60, refer to the foregoing method embodiments. Details are not described herein again.

Figure 7:
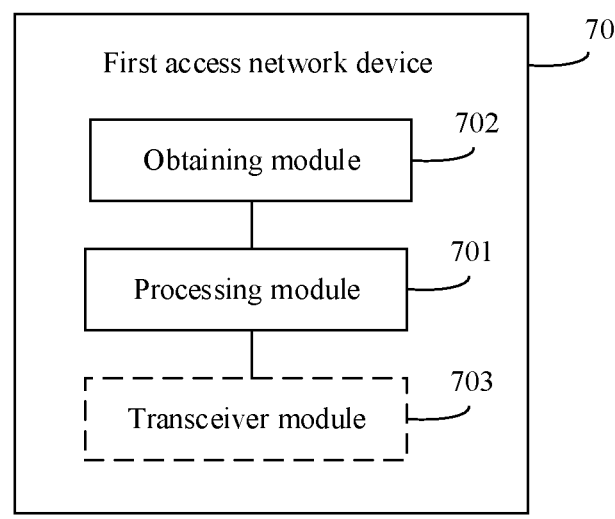
FIG. 7 is a schematic diagram of a structure of a first access network device according to an embodiment of this disclosure.

Alternatively, for example, the communication apparatus is the first access network device in the foregoing method embodiments. FIG. 7 is a schematic diagram of a structure of a first access network device 70 according to an embodiment of this disclosure. The first access network device 70 includes a processing module 701 and an obtaining module 702. Optionally, the first access network device further includes a transceiver module 703. The transceiver module 703 may also be referred to as a transceiver unit, and is configured to implement a sending and/or receiving function. For example, the transceiver module 703 may be a transceiver circuit, a transceiver machine, a transceiver, or a communication interface.

Optionally, the transceiver module 703 may include a receiving module and a sending module, which are respectively configured to perform receiving and sending steps performed by the first access network device in the foregoing method embodiments. The processing module 701 and the obtaining module 702 may be configured to perform steps other than the receiving and sending steps performed by the first access network device in the foregoing method embodiments.

Optionally, in an implementation scenario of this embodiment of this disclosure, that the transceiver module 703 is configured to obtain information/messages may also be understood as that the transceiver module 703 is configured to receive the information/messages. That the transceiver module 703 is configured to output information/messages may also be understood as that the transceiver module 703 is configured to send the information/messages.

The obtaining module 702 is configured to obtain a first power back-off value. The first power back-off value is a power back-off value at a first moment. The processing module 701 is configured to: when a difference between a second power back-off value and the first power back-off value is greater than or equal to a first threshold, adjust an output power based on the first power back-off value. The second power back-off value is a power back-off value at a second moment. The second moment is earlier than the first moment.

Optionally, that the processing module 701 is configured to adjust the output power based on the first power back-off value may include: The processing module 701 is configured to determine a first output power based on the first power back-off value. The processing module 701 is further configured to adjust an output power of the first access network device to the first output power.

Optionally, the obtaining module 702 is further configured to determine a large-scale loss difference. The large-scale loss difference is a difference between a large-scale loss at the first moment and a large-scale loss at the second moment. That the obtaining module 702 is configured to obtain the first power back-off value may include: The obtaining module 702 is configured to determine the first power back-off value based on the large-scale loss difference.

Optionally, that the obtaining module 702 is further configured to determine the large-scale loss difference may include: The obtaining module 702 is further configured to determine the large-scale loss difference based on at least one of the following: an ephemeris of the first access network device, direction information of a beam of the first access network device, weather information within a beam range, or geographical location information of the beam range.

Optionally, that the obtaining module 702 is configured to obtain the first power back-off value may include: The obtaining module 702 is configured to determine the first power back-off value based on a first modulation and coding scheme MCS and a correspondence between an MCS and a power back-off value. The first MCS is an MCS used by the first access network device from the first moment.

Optionally, that the obtaining module 702 is configured to determine the first power back-off value based on the large-scale loss difference may include: The obtaining module 702 is configured to determine a third power back-off value based on the large-scale loss difference. The obtaining module 702 is further configured to determine a fourth power back-off value based on a first MCS and a correspondence between an MCS and a power back-off value. The first MCS is an MCS used by the communication apparatus from the first moment. The obtaining module 702 is further configured to determine the first power back-off value based on the third power back-off value and the fourth power back-off value.

Optionally, that the obtaining module 702 is configured to obtain the first power back-off value may include: The obtaining module 702 is configured to receive the first power back-off value from a control device.

Optionally, the transceiver module 703 is configured to obtain indication information. Alternatively, the transceiver module 703 is configured to receive indication information. That the obtaining module 702 is configured to obtain the first power back-off value may include: The obtaining module 702 is configured to obtain the first power back-off value when the indication information indicates the first access network device to adjust a power.

Optionally, that the obtaining module 702 is configured to obtain the first power back-off value may include: The obtaining module 702 is configured to obtain the first power back-off value when a coverage scope of the beam of the first access network device does not change with movement of the first access network device.

Optionally, that the obtaining module 702 is configured to obtain the first power back-off value may include: The obtaining module 702 is configured to obtain the first power back-off value when a coverage scope of the beam of the first access network device changes.

All related content of the steps in the foregoing method embodiments may be cited in function descriptions of the corresponding functional modules. Details are not described herein again.

In this embodiment, the first access network device 70 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the first access network device 70 may be in a form of the first access network device 30 shown in FIG. 2.

For example, the processor 301 in the first access network device 30 shown in FIG. 2 may invoke computer-executable instructions stored in the memory 302, to enable the first access network device 30 to perform the power adjustment method in the foregoing method embodiments.

Specifically, the processor 301 in the first access network device 30 shown in FIG. 2 may invoke the computer-executable instructions stored in the memory 302, to implement functions/implementation processes of the processing module 701, the obtaining module 702, and the transceiver module 703 in FIG. 7. Alternatively, the processor 301 in the first access network device 30 shown in FIG. 2 may invoke the computer-executable instructions stored in the memory 302, to implement functions/implementation processes of the processing module 701 and the obtaining module 702 in FIG. 7, and the transceiver 303 in the first access network device 30 shown in FIG. 2 may implement functions/implementation processes of the transceiver module 703 in FIG. 7.

The first access network device 70 provided in this embodiment can perform the foregoing power adjustment method. Therefore, for a technical effect that can be achieved by the first access network device 70, refer to the foregoing method embodiments. Details are not described herein again.

Optionally, an embodiment of this disclosure further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. In another possible design, the communication apparatus further includes an interface circuit. The interface circuit is a code/data read and write interface circuit, and the interface circuit is configured to: receive computer-executable instructions (where the computer-executable instructions are stored in a memory, and may be directly read from the memory or may be read through another component), and transmit the computer-executable instructions to the processor. When the communication apparatus is a chip system, the communication apparatus may include a chip, or may include a chip and another discrete component. This is not specifically limited in this embodiment of this disclosure.

Optionally, an embodiment of this disclosure further provides a communication apparatus (for example, the communication apparatus may be a chip or a chip system). The communication apparatus includes an interface circuit and a logic circuit. The interface circuit is configured to obtain to-be-processed data and/or output processed data. The logic circuit is configured to perform the method in any one of the foregoing method embodiments, to process the to-be-processed data and/or generate processed data.

When the communication apparatus is configured to implement the function of the terminal device in the foregoing method embodiments, in a possible case, the to-be-processed data may be at least one of the following: an ephemeris of the first access network device, direction information of a beam of the first access network device, weather information within a beam range, or geographical location information of the beam range. In another possible case, the to-be-processed data may be signal quality information at a second moment and signal quality information at a first moment. Correspondingly, in the two cases, the processed data may be a large-scale loss difference or an index of the large-scale loss difference.

When the communication apparatus is configured to implement the function of the first access network device in the foregoing method embodiments, in a possible case, the to-be-processed data may be at least one of the following: an ephemeris of the first access network device, direction information of a beam of the first access network device, weather information within a beam range, or geographical location information of the beam range. In another possible case, the to-be-processed data may be a first MCS. In still another possible case, the to-be-processed data may be a large-scale loss difference or an index of the large-scale loss difference. Correspondingly, in the three cases, the processed data may be a first power back-off value.

All or some of the foregoing embodiments may be implemented by software, hardware, firmware, or any combination thereof. When a software program is used to implement embodiments, all or some of embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In embodiments of this disclosure, the computer may include the apparatuses described above.

Although this disclosure is described with reference to embodiments, in a process of implementing this disclosure that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce good effect.

Although this disclosure is described with reference to specific features and embodiments thereof, it is clear that various modifications and combinations may be made to them without departing from the spirit and scope of this disclosure. Correspondingly, the specification and accompanying drawings are merely example descriptions of this disclosure defined by the appended claims, and are considered as any of or all modifications, variations, combinations or equivalents that cover the scope of this disclosure. It is clearly that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A power adjustment method, wherein the method comprises:

determining, by a first access network device, a large-scale loss difference, wherein the large-scale loss difference is a difference between a large-scale loss at a first moment and a large-scale loss at a second moment;

determining, by the first access network device, a first power back-off value based on the large-scale loss difference, wherein the first power back-off value is a power back-off value at the first moment;

when a difference between a second power back-off value and the first power back-off value is greater than or equal to a first threshold, adjusting, by the first access network device, an output power based on the first power back-off value, wherein the second power back-off value is a power back-off value at the second moment, and the second moment is earlier than the first moment.

2. The method according to claim 1, wherein the adjusting, by the first access network device, the output power based on the first power back-off value comprises:

determining, by the first access network device, a first output power based on the first power back-off value; and adjusting, by the first access network device, an output power of the first access network device to the first output power.

3. The method according to claim 1, wherein the determining, by the first access network device, the large-scale loss difference comprises:

determining, by the first access network device, the large-scale loss difference based on at least one of the following: an ephemeris of the first access network device, direction information of a beam of the first access network device, weather information within a beam range, or geographical location information of the beam range.

4. The method according to claim 1, wherein the large-scale loss difference and the first power back-off value satisfy the following formula:

$$OBO_{t1}=P_{max}-P_{t2}-\Delta PL_{t1},$$

wherein $OBO_{t1}$ is the first power back-off value, $P_{max}$ is a maximum output power of the wherein OBO first access network device, $P_{t2}$ is an output power at the second moment, and $\Delta PL_{t1}$ is the large-scale loss difference.

5. The method according to claim 1, wherein the obtaining, by the first access network device, the first power back-off value comprises:

determining, by the first access network device, the first power back-off value based on a first modulation and coding scheme (MCS) and a correspondence between an MCS and a power back-off value, wherein the first MCS is an MCS used by the first access network device from the first moment.

6. The method according to claim 1, wherein the determining, by the first access network device, the first power back-off value based on the large-scale loss difference comprises:

determining, by the first access network device, a third power back-off value based on the large-scale loss difference;

determining, by the first access network device, a fourth power back-off value based on a first MCS and a correspondence between an MCS and a power back-off value, wherein the first MCS is an MCS used by the first access network device from the first moment; and determining, by the first access network device, the first power back-off value based on the third power back-off value and the fourth power back-off value.

7. The method according to claim 6, wherein the large-scale loss difference and the third power back-off value satisfy the following formula:

$$OBO_3=P_{max}-P_{t2}-\Delta PL_{t1},$$

wherein $OBO_3$ is the third power back-off value, $P_{max}$ is a maximum output power of the first access network device, $P_{t2}$ is an output power at the second moment, and $\Delta PL_{t1}$ is the large-scale loss difference.

8. The method according to claim 6, wherein the first power back-off value, the third power back-off value, and the fourth power back-off value satisfy the following formula:

$$OBO_{t1}=\max(OBO_3,OBO_4),$$

wherein $OBO_{t1}$ is the first power back-off value, $OBO_3$ is the third power back-off value, $OBO_4$ is the fourth power back-off value, and max(x, y) represents a maximum value of x and y; or the first power back-off value, the third power back-off value, and the fourth power back-off value satisfy the following formula:

$$OBO_{t1}=\alpha OBO_3+\beta OBO_4,$$

wherein $OBO_{t1}$ is the first power back-off value, $OBO_3$ is the third power back-off value, $OBO_4$ is the fourth power back-off value, and $0\leq\alpha\leq1$, $0\leq\beta\leq1$, $\alpha+\beta=1$.

9. The method according to claim 1, wherein the obtaining, by the first access network device, the first power back-off value comprises:

receiving, by the first access network device, the first power back-off value from a control device.

10. The method according to claim 1, wherein before the obtaining, by the first access network device, the first power back-off value, the method further comprises:

receiving, by the first access network device, indication information; and the obtaining, by the first access network device, the first power back-off value comprises:

obtaining, by the first access network device, the first power back-off value when the indication information indicates the first access network device to adjust a power.

11. A power adjustment method, wherein the method comprises:

obtaining, by a first access network device, a first power back-off value, wherein the first power back-off value is a power back-off value at a first moment;

when a difference between a second power back-off value and the first power back-off value is greater than or equal to a first threshold, adjusting, by the first access network device, an output power based on the first power back-off value, wherein the second power back-off value is a power back-off value at a second moment, and the second moment is earlier than the first moment, wherein the obtaining, by the first access network device, the first power back-off value comprises:

obtaining, by the first access network device, the first power back-off value when a coverage scope of a beam of the first access network device does not change with movement of the first access network device.

12. The method according to claim 1, wherein the obtaining, by the first access network device, the first power back-off value comprises:

obtaining, by the first access network device, the first power back-off value when a coverage scope of a beam of the first access network device changes.

13. The method according to claim 11, wherein the adjusting, by the first access network device, the output power based on the first power back-off value comprises:

determining, by the first access network device, a first output power based on the first power back-off value; and adjusting, by the first access network device, an output power of the first access network device to the first output power.

14. The method according to claim 11, wherein the obtaining, by the first access network device, the first power back-off value comprises:

receiving, by the first access network device, the first power back-off value from a control device.

15. The method according to claim 11, wherein before the obtaining, by the first access network device, the first power back-off value, the method further comprises:

receiving, by the first access network device, indication information; and the obtaining, by the first access network device, the first power back-off value comprises:

obtaining, by the first access network device, the first power back-off value when the indication information indicates the first access network device to adjust a power.

16. The method according to claim 1, wherein the obtaining, by the first access network device, the first power back-off value comprises:

obtaining, by the first access network device, the first power back-off value when a coverage scope of a beam of the first access network device changes.

* * * * *